Figure 1:
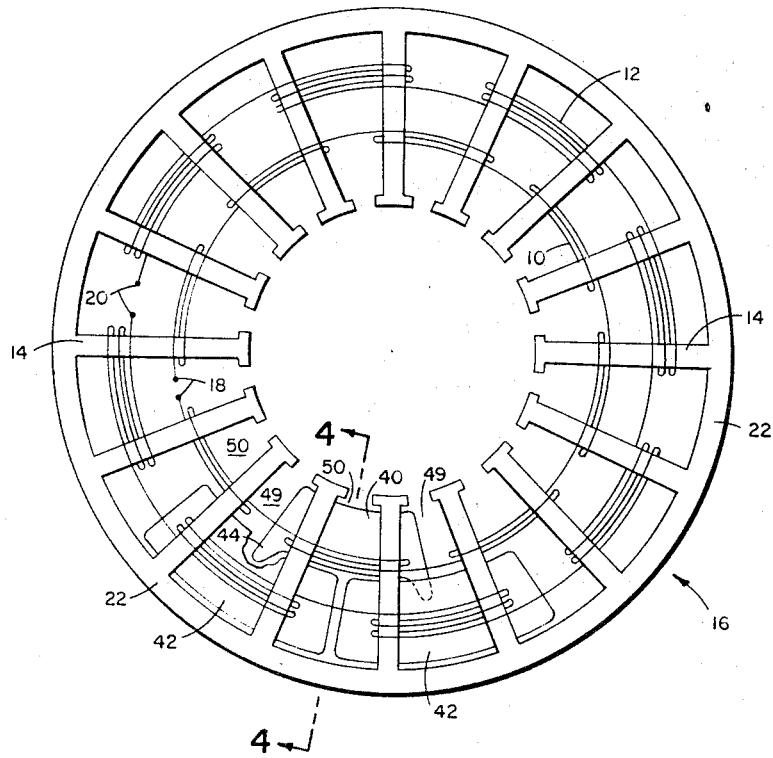

Jan. 14, 1969   R. G. McCOY ET AL   3,422,292
STATOR FOR AN ELECTROMAGNETIC TRANSDUCER
Filed Sept. 21, 1966   Sheet 1 of 2

Robert G. McCoy
Robert J. Port,
INVENTORS.

BY Harry M. Saragovitz
Edward J. Kelly
Herbert Berl
Alfred E. Smith

United States Patent Office 3,422,292
Patented Jan. 14, 1969

3,422,292
STATOR FOR AN ELECTROMAGNETIC
TRANSDUCER
Robert G. McCoy and Robert J. Port, Whippany, N.J.,
assignors, by mesne assignments, to the United States
of America as represented by the Secretary of the
Army
Filed Sept. 21, 1966, Ser. No. 581,111
U.S. Cl. 310—15                              3 Claims
Int. Cl. H02k 33/00; H02k 35/00

This invention relates to electromagnetic transducers and more particularly to an improved stator for an electromagnetic transducer affording more space for primary and secondary coils and an increased width of stator legs.

In accordance with the present invention, a novel concept provides a new lamination configuration yielding an optimum winding space to rigidity ratio in a stator of an electromagnetic transducer. Previously, if the outside and inside diameters were not changed, and the width of the stator legs was increased, the amount of area used for the placement of the windings was reduced. To put the same amount of wire into less area, the efficiency of the usable winding area must be increased. The stator legs are shaped in an unusual angular configuration to maximize the area alotted to the primary and secondary windings, and to minimize the unusable areas in the eyes of the windings. The angular configuration reduces the physical interference between the primary and secondary coils as they cross over between their slots. The efficient allocation of winding space salvages usable area wasted by previous designs. This additional area can be used to advantage by placing more turns in the primary or secondary windings, or to increase the width of the stator legs. The width of the legs would be increased to improve the stability of the unit, which, when coupled with the improved winding efficiency, will produce an optimum winding space to rigidity ratio.

An object of the present invention is to improve the mechanical stability of existing stators as well as their electrical and winding efficiencies.

Another object of the present invention is to provide a larger magnetic flux path in an electromagnetic stator.

Still another object of the present invention is to provide a larger separation of stator legs with opposite polarity and to reduce magnetic flux leakage between the legs of opposite polarity.

Yet another object of the present invention is to provide a better utilization of winding area resulting in a decrease in production time needed for the placement of the windings.

A further object of the present invention is to produce a unit with a larger Q-factor, by a decreased length of the turns of wire in the primary winding. The larger Q-factor will also decrease the effect of temperature on the output voltage.

Figure 4:
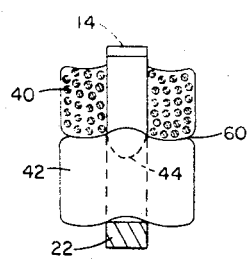
Figure 2:
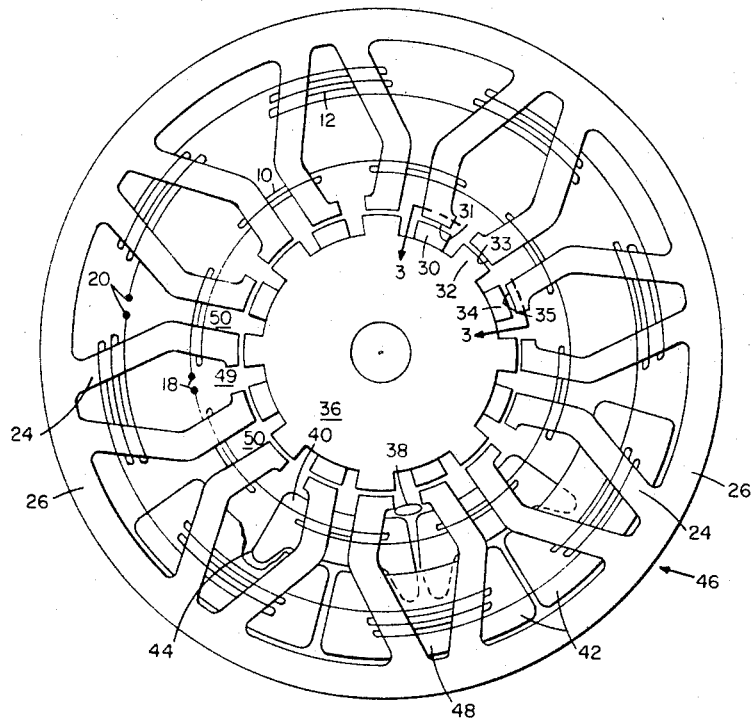
Figure 3:
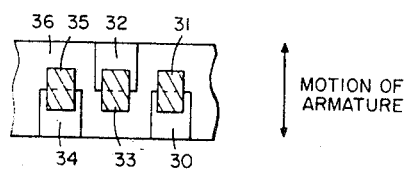

Further objects, features, and advantages of this invention will suggest themselves to those skilled in the art and will become apparent from the following description of the invention taken in connection with the accompanying drawings, wherein:

FIGURE 1 is a diagrammatic axial view of a typical prior art stator lamination stack, with three coil segments shown in outline, FIGURE 2 is a diagrammatic axial view of the new laminated stator design with five coil segments shown, and with the armature for which the stator was specifically designed, FIGURE 3 is a section showing the stator poles and armature teeth viewed at line 3—3 of FIGURE 2, and FIGURE 4 is a section view taken at line 4—4 of FIGURE 1, showing the interrelation of the wires of the coil segments.

Referring now to FIGURE 1 of the drawings, a typical prior art laminated stator is shown. Primary coil 10 and secondary coil 12 are shown wound around a plurality of stator legs 14 of an electromagnetic transducer 16. The primary input terminals are represented by numeral 18 and the secondary output terminals are shown by numeral 20. The stator yoke 22 furnishes a flux path for flux generated in the various stator legs 14. This figure also shows outlines 40 and 42 of the approximate spaces occupied by the primary and secondary coil segments, respectively. It is evident that if the secondary coils were to fill, say, two-thirds of their slot spaces 50, and if it is desired to fill the primary slot spaces 49, say, half full, it will be necessary to bend the primary coil wires, at the points where they enter their slots, outwardly into the eye of the secondary coils as shown at 44. It is also evident that, in this case, there will be inadequate space for the primary wires to cross from one slot 49 to their next slot 49 because of the large bulk of secondary wires emerging from the intermediate slot 50 and partially blocking the path. This is illustrated by the outlines 40 and 42 of these coils in FIGURE 4 which is a section view at line 4—4 of FIGURE 1. Region 60 in FIGURE 4 illustrates the area where the primary and secondary coils cross and interfere with or block each other. It is this interference that limits the number of turns that can be wound in these coils.

Reference may now be made to the improved electromagnetic transducer in FIGURE 2, wherein like reference numerals 10, 12, 18, 20, 40, 42, 44, 49 and 50 designate the same parts as in FIGURE 1. The stator legs 24 are wider than stator legs 14 of FIGURE 1, and yoke 26 is wider than yoke 22 of FIGURE 1, thus improving the mechanical stability of the new electromagnetic transducer 46. Both primary coil 10 and secondary coil 12 are shown schematically. Secondary coil segments 42 are larger than primary coil segments 40, and occupy the greater winding space. The primary coils 40 are located radially inward from secondary coils 42 and are held in place by conventional retaining wedges 38, usually of insulating material. To minimize the interference between the primary and secondary coils as described for FIGURES 1 and 4 and thereby maximize the usable winding space, the secondary slots 50 are made as narrow as practicable at their inner portions by bringing the legs 24 parallel through the primary winding region. This minimizes the dead space in the eye of the primary coil 40. Then the outer portions of these legs are drastically spread to widen the slot spaces for the secondary coils 42. The effect of this on the primary slots 49 is to increase their inner usable portions and to decrease their outer portions which are in the eyes of the secondary coils 42. This configuration not only maximizes the use of the space within the slots but it also permits placing a greater percentage of the secondary windings toward the outer portions of their slots 50, and a greater percentage of the primary windings toward the inner portions of their slots 49, so as to reduce the interferences in the turn-around regions outside of the slots where the coils must pass one another to get back into their slots, as previously described and illustrated by region 60 in FIGURE 4. The reduction of these interferences and improved use of slot space cooperate to improve the volumetric efficiency of the winding. The salvaged area can be used to advantage by placing more turns in the primary or secondary windings, or to increase the width of the legs.

Referring to FIGURES 2 and 3, it is seen that armature 36 has an axial length substantially greater than that of stator 46. As illustrated in FIGURE 3, armature teeth 30, 32, and 34 extend only half way across armature 36. Successive teeth extend from opposite ends of the armature to its center. Stator pole faces 31, 33, and 35 are, respectively, opposite their armature teeth 30, 32, and 34. This will be recognized as a familiar type of construction such that when an alternating voltage is impressed at primary input terminals 18, a current will pass through primary coils 10 inducing equal voltages of opposite phase in secondary coils 12 if armature 36 is centered, thereby yielding a zero voltage at secondary output terminals 20. However, if armature 36 is axially displaced upward in FIGURE 3, armature teeth 30 and 34 cover more of stator pole faces 31 and 35, respectively, while armature tooth 33 covers less of stator pole face 32. With this example repeated with all armature teeth and stator pole faces, the result is a net induced voltage appearing at the secondary terminals, the relative phase of which depends on the direction of displacement. Armature 36 illustrates a type which cooperates with stator 46 to comprise a linear electromechanical transducer or microsyn. The identical stator 46 can be used with a slightly different armature to comprise a rotary microsyn. These microsyns are used in such devices as accelerometers.

In addition to the improvement in the ratio of winding space to mechanical rigidity, the concept provides the following improvements and advantages. The shape of the legs is such that legs of opposite polarity have the largest average separation with resulting reduced magnetic flux leakage between legs of opposite polarity. The legs and their yoke are wider than possible with the old design, for the equivalent outside diameter and usable winding area, giving a larger flux path.

The mechanical strength and stiffness with respect to bending and twisting of the legs is increased resulting in an increase in both mechanical and electrical stability during environmental stresses such as temperature changes, and a decrease in production rejects resulting from dimensional changes during handling of the lamination stack and placement of the windings. By having a better utilization of winding area, there is a decrease in production time needed for their placement.

It is believed apparent from the foregoing description that we have provided a novel stator for an electromagnetic transducer which obviates many of the difficulties heretofore encountered in previous laminated stator cores.

We claim:
1. An improved laminated stator for an electromagnetic transducer including a circular laminated stator core with a plurality of pairs of stator legs located radially inward; said stator legs being symmetrically arranged and of the same cross sectional area; the improvement comprising: each adjacent pair of said stator legs having innermost sections that are generally parallel and having a small eye therebetween; and an outermost section of each of said stator legs obliquely disposed with respect to an adjacent leg portion, leaving a small eye between alternate pairs, providing maximum area for primary and secondary windings, and minimizing the unusable area in the eyes of the windings; whereby said stator leg cross sectional area can be increased, providing a larger magnetic flux path with no loss of winding space, and said stator leg arrangement is such that legs of opposite polarity have the largest average separation, resulting in reduced magnetic flux leakage between stator legs of opposite polarity and improved electrical and winding efficiencies.

2. An improved laminated stator for an electromagnetic transducer as set forth in claim 1 wherein said generally parallel sections have oppositely facing surfaces that are uniformly smooth to provide for a minimum uniform gap between each adjacent pair of said stator legs.

3. An improved laminated stator for an electromagnetic transducer as set forth in claim 2 wherein said innermost parallel sections in said outermost oblique sections are oriented so as to form a funnel shaped configuration therebetween.

References Cited
UNITED STATES PATENTS

| | | | |
|---|---|---|---|
| 3,179,825 | 4/1965 | Terry et al. | 310—179 XR |
| 2,894,157 | 7/1959 | Morrill | 310—179 |
| 2,485,628 | 10/1949 | Morrill | 310—180 |
| 2,993,136 | 7/1961 | Richer et al. | 310—258 |
| 2,303,293 | 11/1942 | Thomas | 310—254 XR |

MILTON O. HIRSHFIELD, *Primary Examiner.*

B. A. REYNOLDS, *Assistant Examiner.*

U.S. Cl. X.R.

310—179, 180, 12, 254